United States Patent [19]

Mitchell

[11] Patent Number: 5,102,268
[45] Date of Patent: Apr. 7, 1992

[54] FINE ADJUSTMENT MECHANISM FOR A TOOLHOLDER

[75] Inventor: Robert N. Mitchell, Raleigh, N.C.

[73] Assignee: Kennametal Inc., Latrobe, Pa.

[21] Appl. No.: 701,251

[22] Filed: May 16, 1991

[51] Int. Cl.$^5$ .............................................. B26D 1/12
[52] U.S. Cl. ...................................... 407/36; 407/44; 407/46; 408/185
[58] Field of Search ..................... 407/36–40, 407/44, 45, 76, 77, 86–88, 92, 93, 46, 101, 105; 408/713, 153, 185, 188

[56] References Cited

U.S. PATENT DOCUMENTS

| 2,659,962 | 11/1953 | Doerseln | 29/96 |
| 3,492,709 | 2/1970 | LeBarre | 407/76 |
| 3,611,527 | 10/1971 | Hudson | 29/98 |
| 3,623,201 | 11/1971 | Gustafson | 407/101 |
| 3,792,517 | 2/1974 | Gage | 407/37 |
| 3,839,772 | 10/1974 | Shimomura et al. | 407/36 |
| 4,164,380 | 8/1979 | Peters | 407/36 |
| 4,330,227 | 5/1982 | Raye et al. | 407/36 |
| 4,932,813 | 6/1990 | Qvart | 407/46 |

FOREIGN PATENT DOCUMENTS 3042051 7/1982 Fed. Rep. of Germany ........ 407/36

Primary Examiner—Larry I. Schwartz
Assistant Examiner—Kevin J. Carroll
Attorney, Agent, or Firm—James G. Porcelli

[57] ABSTRACT

The present invention relates to a milling cutter having a cutter body and a plurality of replaceable tool cartridges circumferentially spaced about the outer periphery of the cutter body. An adjustment mechanism permits adjustment of the tool cartridges in the direction parallel to the axis of rotation of the cutter body. The adjustment mechanism includes an adjustment screw threaded into a corresponding bore in the cutter body. The head of the adjustment screw projects into an inclined throughbore in the tool cartridge. When the adjustment screw is turned, the head of the screw bears against the inner surface of the throughbore causing the tool cartridge to be axially displaced. A locking screw is tightened to secure the tool cartridge in place after it has been adjusted.

17 Claims, 4 Drawing Sheets

FINE ADJUSTMENT MECHANISM FOR A TOOLHOLDER

FIELD OF THE INVENTION

The present invention relates generally to an adjustable toolholder, and more particularly to an adjustment mechanism for adjusting the toolholder in the axial direction.

BACKGROUND OF THE INVENTION

In any metalworking operation, it is critical to adjust the position of the cutting tool relative to the workpiece in order to obtain an accurate cut, particularly with tools having multiple inserts simultaneously engaging the workpiece, such as milling cutters.

One type of milling cutter which has been used in the past comprises a generally cylindrical cutter body and a plurality of replaceable cartridges adapted to be mounted to the cutter body for holding the cutting inserts. The cartridges are normally adjustable parallel to the axis of rotation of the cutter body to adjust face run-out. That is, the cutting edges of the inserts can be adjusted to a common plane. If the inserts are not adjusted to a common plane, only the forwardmost insert will be cutting. Not only does this condition affect the quality of the finish, but also reduces tool life. For high quality finishes, the face run-out of the cutting inserts must be adjusted to within two-ten thousandths of an inch. Previously, this adjustment has been obtained by unclamping the tool cartridge, manually positioning the cartridge, and then reclamping the cartridge after the adjustment is complete. This process is relatively cumbersome and time consuming. Further, with this type of adjustment there is a tendency of the tool cartridge to slip during tightening of the clamping mechanism.

SUMMARY AND OBJECTS OF THE INVENTION

The present invention provides a method and apparatus for making fine adjustment to the position of the cutting insert in the axial direction. At least one toolholder having an insert seat formed therein is mounted to a support block. The removable toolholder is held in place by a locking screw. Adjustment in the axial direction is provided by an adjusting screw having a rounded head which cooperates with an inclined throughbore extending through the toolholder. The axis of the adjusting screw lies in a plane perpendicular to the direction of adjustment. As the screw is turned in, the rounded head engages the forward side of the throughbore and urges the toolholder forwardly. When the adjusting screw is turned out, the rounded head engages the back side of the throughbore and urges the toolholder rearwardly. Once the cutting edge of the insert is properly adjusted, the locking screw can be tightened to clamp the toolholder in place. The rounded head of the adjusting screw acts as a positive stop to prevent the toolholder from slipping during tightening of the locking screw.

Based on the foregoing, it is a primary object of the present invention to provide a toolholder having positive adjustment means for adjusting the axial position of the tool insert relative to the tool body.

Another object of the present invention is to provide an adjustment mechanism for a toolholder which allows fine adjustment of the cutting edge of the inserts to within two-ten thousandths of an inch to produce a high quality finish.

Still another object of the present invention is to provide a fine adjustment mechanism which can be readily adjusted to assure longer tool life.

Other objects and advantages of the present invention will become apparent and obvious from a study of the following description and the accompanying drawings which are merely illustrative of such invention.

DETAILED DESCRIPTION OF THE INVENTION

Figure 1:
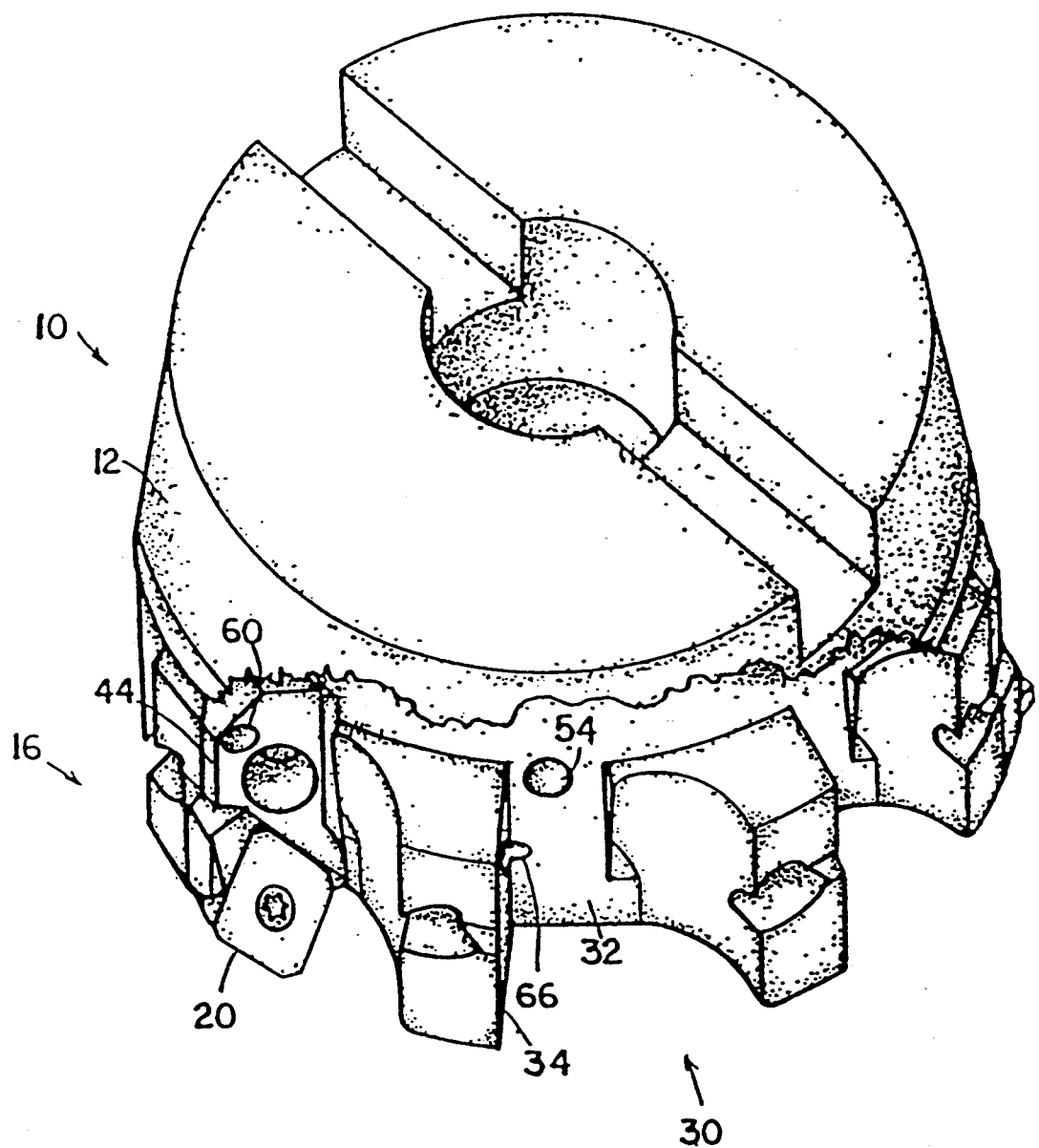
FIG. 1 is a perspective view of a milling cutter incorporating the adjustment mechanism of the present invention.
Figure 2:
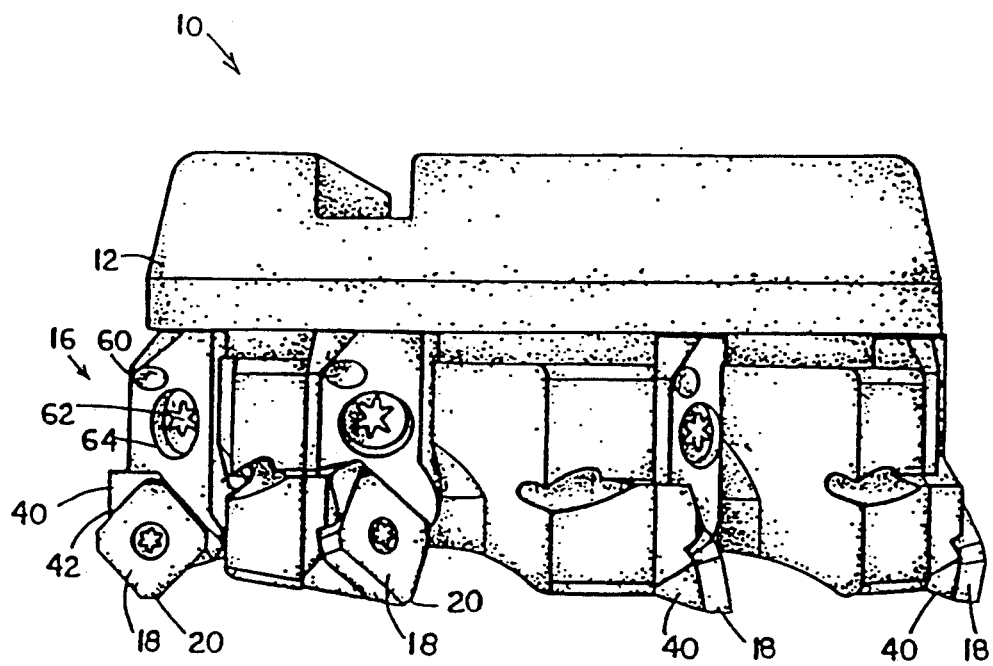
FIG. 2 is a side elevation view of the same milling cutter.
Figure 3:
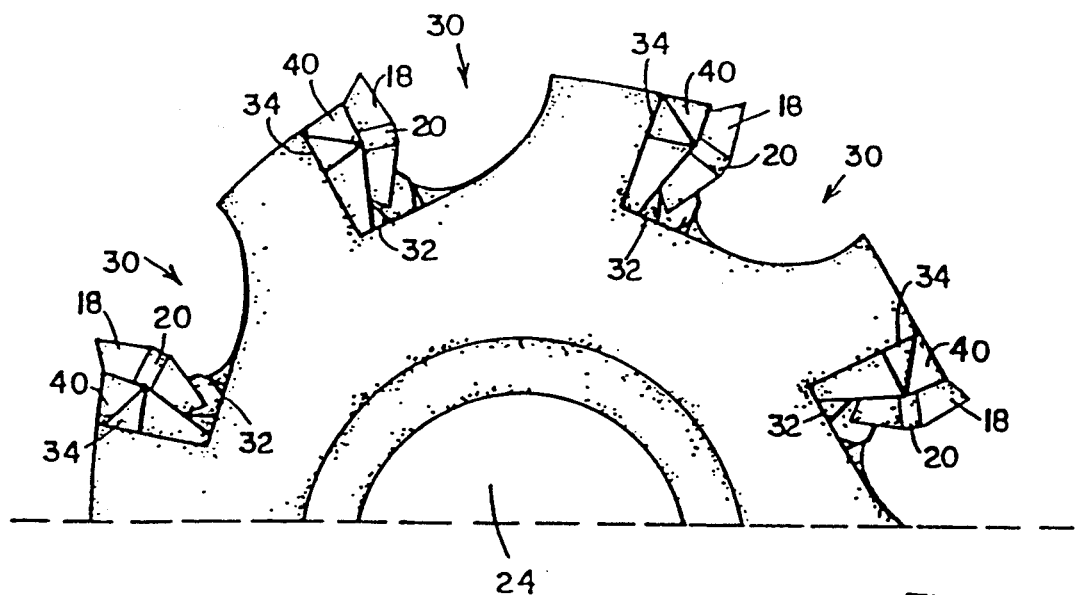
FIG. 3 is a bottom plan view of the milling cutter.

Referring now to the drawings, and particularly to FIG. 1, a toolholder incorporating the adjustment mechanism of the present invention is shown therein and indicated generally by the numeral 10. The toolholder 10 of the illustrated embodiment comprises a milling cutter, although the use of the present invention is not so limited. The present invention can also be used, for example, in turning or boring tools, as well as a variety of milling tools.

The milling cutter 10 is adapted to be mounted to a spindle of a milling machine. The milling cutter 10 includes a generally cylindrical cutter body 12 adapted to be mounted to the forward end of a spindle adapter. The spindle adapter typically includes a tapered rear portion that inserts into a tapered cavity in the machine spindle. The cutter body 12 is adapted to carry a plurality of replaceable tool cartridges 16 that hold carbide cutting inserts 18. The cutting inserts 18 project from the forward end of the cutter body 12 and include a cutting edge 20 adapted to engage the workpiece. The cutter body 12 and tool cartridges 16 are provided with means to adjust the axial position of the cartridge 16 so as to position the cutting edges 20 of the inserts 18 to a common plane.

The cutter body 12 is generally cylindrical in form and includes an opening 24 in the central portion 22 to receive the spindle adapter. The cutter body 12 is held on the spindle adapter by a large screw (not shown) which threads into the end of the spindle adapter. A plurality of tool recesses 30 is formed in the outer periphery of the cutter body 12. Each tool recess 30 includes first and second tool reference surfaces 32 and 34 respectively. The first tool reference surface 32 lies generally perpendicular to a radius of the cutter body. The second tool reference surface 34 lies generally parallel to a radius of the cutter body 12. Both the first and second tool reference surfaces 32 and 34 lie in planes extending parallel to the axis of the cutter body 12. The first and second tool reference surfaces 32 and 34 preferably form a 90 degree angle with respect to one another.

As previously indicated, the cutter body 12 is adapted to carry a plurality of replaceable tool cartridges 16. Each tool cartridge 16 includes a forward portion 40 formed with a recessed insert seat 42 and a rearward portion 44. Each cartridge also includes first and second abutment surfaces 46 and 48 respectively, which lie at a 90 degree angle with respect to one another. The first abutment surface 46 is adapted to mount against a first tool reference surface 32 of the cutter body 12. The second abutment surface 48 mounts against a second tool reference surface 34. Thus, it will be appreciated that the cooperation of the first and second tool reference surfaces 32 and 34 with the first and second abutment surfaces 46 and 48 function to accurately position the tool cartridge 18 in the radial and tangential directions.

To adjust the tool cartridge 16 in the axial direction, the present invention employs an adjusting screw 52 that screws into an adjusting screw hole 54 in the cutter body 12. The axis of the adjusting screw hole 54, and thus the adjusting screw 52 is coincident with a radius extending from the center of the cutter body 12. The head 56 of the screw 52 is generally spherical in form and includes a hex socket 58 adapted to receive an allen wrench.

Figure 4:
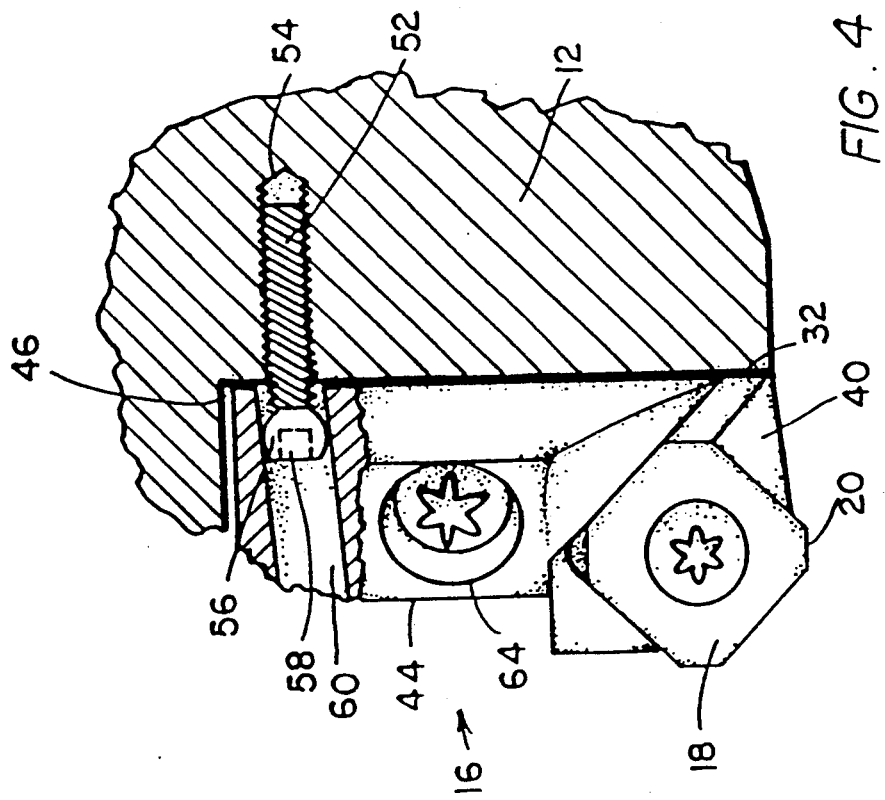
FIG. 4 is a partial section view of the milling cutter with the tool cartridge shown in elevation.
Figure 5:
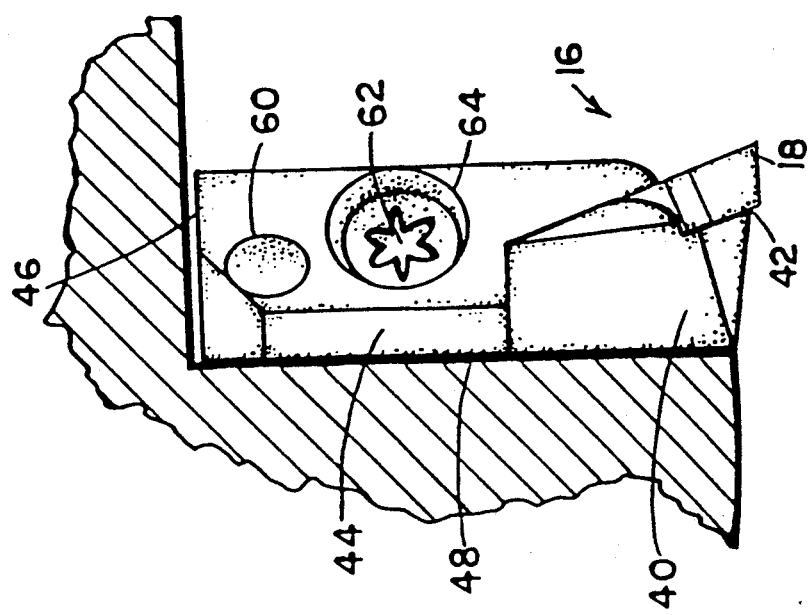
FIG. 5 is another partial section view of the milling cutter with the tool cartridge shown in elevation.

An inclined throughbore 60 is formed in the rearward portion 44 of the tool cartridge 16 and is positioned to overlie the adjusting screw hole 54. The throughbore 60 is inclined slightly in the axial direction as shown best in FIG. 4, the angle of inclination being exaggerated somewhat to better illustrate the invention. The angle of inclination is actually between approximately 1 and 5 degrees.

The head 56 of the adjustment screw 52 extends into the inclined throughbore 60 when the tool cartridge 16 is mounted to the cutter body 12. The head 56 of the adjustment screw 52 is very nearly the same size as the diameter of the throughbore 60. When the adjusting screw 52 is turned inwardly, the spherical head 56 bears against the forward side of the inclined throughbore 60 and urges the tool cartridge 16 forwardly. Conversely, when the adjusting screw 52 is turned out, the spherical head 56 bears against the back portion of the inclined throughbore 60 and urges the tool cartridge 16 rearwardly. The cooperation of the spherical head 56 with the inner surface of the inclined throughbore 60 thus provides adjustment in both the forward and rearward axial directions.

Figure 6:
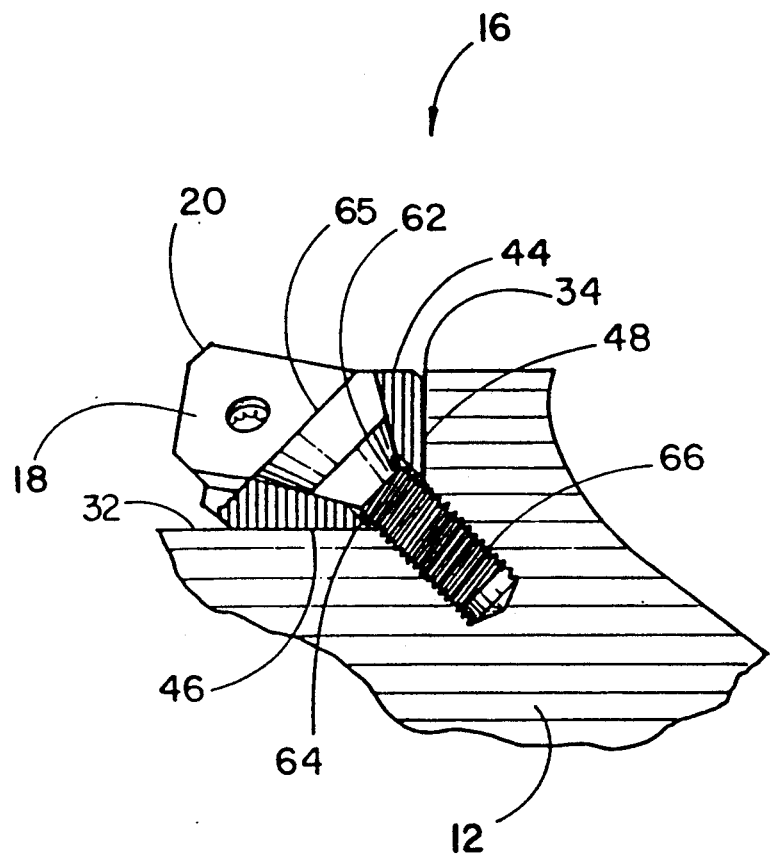
FIG. 6 is a partial section view of the milling cutter with the tool cartridge shown in cross-section.

A locking screw 62, having a conical head, secures the tool cartridge 16 in the adjusted position. The locking screw 62 extends through a clearance opening 64 in the rear portion of the tool cartridge 16 and is threaded into a locking screw hole 66 (See FIG. 1) in the cutter body 12. The clearance opening 64 is larger than the shaft of the locking screw 62 to allow room for adjustments and includes a conical shaped counterbore 65. The locking screw 62 should preferably be disposed at an approximate 45 degree angle to both the first and second tool reference surfaces 32 and 34 so that the tool cartridge 16 will be firmly pressed against those surfaces when the locking screw 62 is tightened. The centerline of the clearance opening 64 should be positioned such that it will lie rearwardly of the centerline of the locking screw 62 throughout the adjustment range of the cartridge 16. As a result, the conical head of the screw will initially contact the rearmost portion of the counterbore 65 to urge the cartridge against the adjustment screw 52. Further, tightening will cause the screw to bend until the head of the screw 62 is seated firmly in the counterbore as shown in FIG. 6.

To use the milling cutter 10 of the present invention, the cutting inserts 18 are mounted on tool cartridges 16 which are, in turn, mounted on the cutter body 12. The locking screws 62 are tightened sufficiently to hold the tool cartridges 16 in place in the absence of an applied force, but to permit them to be adjusted. Using a dial indicator or other instrument, each of the replaceable cartridges 16 is adjusted so that the cutting edge 20 of the insert 18 held by the cartridge 16 is within two-ten thousandths of an inch of a common plane. The adjustment is accomplished by turning the adjusting screw 52 as required to move the cartridge in the direction needed to bring the cutting edge 20 to the common plane. If a forward adjustment is required, the adjusting screw 52 is turned in (or clockwise) to move the cutting edge 20 forwardly towards the common plane. If a backward adjustment is required, the adjusting screw 52 is turned out (or counter-clockwise) to move the cutting edge 20 backwardly. In making a backward adjustment, it is generally advisable to move the cutting edge 20 of the insert 18 beyond the common plane and then making a final forward adjustment to align the cutting edge 20 with the common plane. This procedure will prevent the tool cartridge 16 from slipping backward when the locking screw 62 is tightened. When the cutting edge 20 of the insert 18 is adjusted to the common plane, the locking screw 62 is tightened. There is no tendency of the cartridge 16 to slip during tightening of the locking screw 62 since the head 56 of the screw 52 also functions as a positive stop to prevent the cartridge 16 from slipping backward.

The present invention may, of course, be carried out in other specific ways than those herein set forth without departing from the spirit and essential characteristics of the invention. The present embodiments are, therefore, to be considered in 11 changes coming within the meaning and equivalency range of the appended claims are intended to be embraced therein.

What is claimed is:

1. A milling cutter comprising:
   (a) a generally cylindrical cutter body;
   (b) a plurality of replaceable tool cartridges circumferentially spaced about the cutter body, each said tool cartridge having a recessed insert seat for receiving a cutting insert having a cutting edge adapted to engage a workpiece;
   (c) means for adjusting the position of each tool cartridge in a direction parallel to the axis of rotation of the cutter body, said adjusting means including:
      (1) a threaded hole formed in the cutter body;
      (2) an adjusting screw having a rounded head screwed into the threaded hole of the cutter body;
      (3) a throughbore extending through the tool cartridge for receiving the rounded head of the adjusting screw, said throughbore being inclined relative to the axis of the adjusting screw so that when the screw is turned the rounded head of the adjusting screw bears against the inner surface of the throughbore to urge the tool cartridge either forwardly or backwardly in a direction parallel to the axis of rotation of the cutter body; and
   (d) means for locking the tool cartridge in its adjusted position.

2. The milling cutter according to claim 1 wherein the threaded hole in the cutter body extends radially relative to the axis of rotation of the cutter body.

3. The milling cutter according to claim 1 wherein the throughbore is inclined at an angle of between 1 and 5 degrees relative to the axis of the adjusting screw.

4. The milling cutter according to claim 1 wherein the securing means comprises a locking screw which extends through a clearance opening in the tool cartridge.

5. The milling cutter according to claim 4 wherein the clearance opening includes a conical surface and wherein the locking screw includes a conical head adapted to engage the conical surface of the clearance opening to urge the tool cartridge firmly against the spherical head of the adjusting screw.

6. A milling cutter comprising:
   (a) a cutter body adapted to be mounted on a machine spindle and rotated about a central axis, said cutter body including a plurality of circumferentially spaced tool cartridge slots;
   (b) a plurality of removable tool cartridges disposed in respective tool cartridge slots, each tool cartridge having a forward portion formed with an insert seat adapted to receive a cutting insert and a rearward portion;
   (c) means associated with each tool cartridge for adjusting the position of the tool cartridge in a direction parallel to the central axis of the cutter body, said adjusting means including:
      (1) a threaded hole formed in the cutter body and extending radially with respect to the central axis of the cutter body;
      (2) an adjusting screw having a spherical head threaded into the threaded hole of the cutter body; and
      (3) a throughbore extending through the rearward portion of the tool cartridge for receiving the spherical head of the adjusting screw, the axis of said throughbore being inclined forwardly relative to the axis of the adjusting screw and lying in a radial plane extending through the central axis of the cutter body so that when the adjusting screw is turned the spherical head bears against the inner surface of the throughbore to urge the tool cartridge either forwardly or backwardly in a direction parallel to the central axis of the cutter body; and
   (d) securing means for securing the tool cartridge in a fixed position after adjustment of the tool cartridge.

7. The milling cutter according to claim 6 wherein the tool cartridge slots each include first and second tool reference surfaces engaged by the tool cartridge and extending parallel to the axis of rotation of the cutter body for positioning the tool cartridge in the radial and tangential directions with respect to the central axis.

8. The milling cutter according to claim 7 wherein the first and second tool reference surfaces are disposed at 90 degrees with respect to one another.

9. The milling cutter according to claim 7 wherein the securing means for securing the tool cartridge within a respective tool cartridge slot includes means for applying a force to said tool cartridge having a radially inwardly directed component for forcing said tool cartridge against said first tool reference surface and a tangential component directed opposite the direction of rotation of said cutter body for forcing said tool cartridge against said second tool reference surface.

10. The milling cutter according to claim 9 wherein said securing means comprises a locking screw threaded into a corresponding screw hole in said cutter body and having a head which engages the tool cartridge.

11. The milling cutter according to claim 10 wherein the axis of the locking screw bisects the angle between the first and second tool reference surfaces.

12. A milling cutter comprising:
   (a) a cutter body adapted to be mounted on a machine spindle and rotated about a central axis, said cutter body including a plurality of recesses formed around an outer periphery of said cutter body;
   (b) a plurality of removable tool cartridges disposed in respective recesses;
   (c) wherein each recess includes a first tool reference surface extending generally perpendicular to a radius of the cutter body for positioning the tool cartridge in the radial direction, and a second tool reference surface extending generally parallel to a radius of the cutter body for positioning the tool cartridge in the tangential direction, both of said first and second tool reference surfaces being parallel to the axis of rotation of said cutter body;
   (d) means for adjusting the position of the tool cartridge in a direction parallel to the central axis of the cutter body, said adjusting means including:
      (1) a first threaded hole formed in the cutter body and extending along a radius of the cutter body;
      (2) an adjusting screw having a generally spherical head threaded into the first threaded hole of the cutter body; and
      (3) a throughbore extending through the tool cartridge for receiving the spherical head of the adjusting screw, the axis of the throughbore being inclined relative to the axis of the adjusted screw and central axis of the cutter body so that when the adjusted screw is turned the spherical head bears against the inner surface of the throughbore causing the tool cartridge to be axially displaced; and
   (e) means for securing the tool cartridge in a fixed position.

13. The milling cutter according to claim 12 wherein the first and second tool reference surfaces are disposed at 90 degrees with respect to one another.

14. The milling cutter according to claim 13 wherein the securing means for securing the tool cartridge within a respective tool cartridge slot includes means for applying a force to said tool cartridge having a radially inwardly directed component for moving the tool cartridge against the first tool reference surface and a tangential component directed opposite the direction of rotation of the cutter body for urging the tool cartridge against the second tool reference surface.

15. The milling cutter according to claim 14 wherein the securing means comprises a locking screw threaded into a second threaded bore in said cuter body, said locking screw having a head which engages the tool cartridge to urge the tool cartridge against the first and second tool reference surfaces.

16. The milling cutter according to claim 15 wherein the axis of the locking screw bisects the angle between the first and second tool reference surfaces.

17. A tool mounting apparatus comprising:
   (a) a support block;
   (b) at least one toolholder removably mounted on said support block and having an insert seat for receiving a cutting insert;

(c) means for adjusting the toolholder in an axial direction relative to the support block, said adjusting means including:
  (1) a threaded hole formed in the support block;
  (2) an adjusting screw having a rounded head screwed into the threaded hole in the support block;
  (3) a throughbore extending through the toolholder for receiving the rounded head of the adjusting screw, said throughbore being inclined relative to the axis of the adjusting screw so that when the adjusting screw is turned the rounded head engages the inner surface of the throughbore to urge the toolholder either forwardly or backwardly in the axial direction; and
(d) means for securing the toolholder in its adjusted position.

* * * * *